United States Patent [19]

Chen et al.

[11] Patent Number: 5,786,855
[45] Date of Patent: Jul. 28, 1998

[54] METHOD AND APPARATUS FOR CODING SEGMENTED REGIONS IN VIDEO SEQUENCES FOR CONTENT-BASED SCALABILITY

[75] Inventors: Tsuhan Chen, Middletown; Barin Geoffry Haskell, Tinton Falls, both of N.J.

[73] Assignee: Lucent Technologies Inc., Murray Hill, N.J.

[21] Appl. No.: 548,818

[22] Filed: Oct. 26, 1995

[51] Int. Cl.$^6$ .................................................. H04N 7/12
[52] U.S. Cl. ............................................. 348/391; 348/395
[58] Field of Search ........................... 348/390, 391, 348/392, 393, 395, 26–30, 160–172, 403; 382/166, 282, 283, 9, 16, 17, 25, 28

[56] References Cited

U.S. PATENT DOCUMENTS

| | | | |
|---|---|---|---|
| 4,965,845 | 10/1990 | Chan et al. | 348/391 |
| 5,091,967 | 2/1992 | Ohsawa | 348/26 |
| 5,162,898 | 11/1992 | Aono | 348/391 |
| 5,293,228 | 3/1994 | Marti | 348/391 |
| 5,448,296 | 9/1995 | Music | 348/390 |
| 5,453,787 | 9/1995 | Hancock et al. | 348/391 |
| 5,510,838 | 4/1996 | Yomdin et al. | 348/390 |
| 5,646,691 | 7/1997 | Yokoyama | 348/26 |

*Primary Examiner*—Tommy P. Chin
*Assistant Examiner*—Luanne P. Din

[57] ABSTRACT

A method and apparatus for generating region frames from video frames are disclosed which employs an industry standard encoder to lessen the negative impact on the quality of the transmitted video sequence while consuming fewer bits. The method and apparatus utilizes image segmentation and color replacement techniques to create the region frames. Each region frame includes a subject region, zero or more previously segmented regions and zero or more non-subject regions. The subject region is defined by the pixels of the original video frame. The previously segmented regions and non-subject regions are assigned replacement pixels $P_{n,y}$ and $C_n$, respectively. The replacement pixel $C_n$ is chosen to indicate a color that is not likely to be confused with any color in the subject region $R_n$. The replacement pixels $P_{n,y}$ are chosen such that the compression ratio of the region frame data is maximized. Using the region frames, content based scalability can be provided without the need for special encoders and/or channels having a wider bandwidth.

29 Claims, 11 Drawing Sheets

FIG. 2

| VIDEO SEQUENCE | COMPONENTS OF VIDEO SEQUENCE |
|---|---|
| $f_0$ | FRAME DATA: INFORMATION THAT DEFINES VIDEO FRAMES USING PIXEL VALUES |
| $f_1$ | SEGMENTATION DATA: INFORMATION THAT INDICATES THE REGION TO WHICH A PARTICULAR PIXEL OR PIXEL VALUE BELONGS |
| $f_2$ | REGION FRAME DATA: INFORMATION THAT DEFINES REGION FRAMES SEGMENTED FROM VIDEO FRAMES USING ORIGINAL PIXEL VALUES FOR THE SUBJECT REGION AND REPLACEMENT PIXEL VALUES $c_n$ AND $p_n$ FOR THE NON-SUBJECT REGION AND PREVIOUSLY SEGMENTED REGION, RESPECTIVELY |
| | REPLACEMENT PIXEL DATA: INFORMATION THAT INDICATES WHAT THE REPLACEMENT PIXELS $c_n$ AND $p_n$ ARE FOR THE REGION FRAMES |
| | REGIONAL GROUP DATA: INFORMATION THAT INDICATES WHICH REGION FRAMES ARE SEGMENTED FROM THE SAME VIDEO FRAME |
| $f_3$ | ENCODED REGION FRAME DATA: REGION FRAME DATA WHICH HAS BEEN PROCESSED BY AN ENCODER, I.E., REGION FRAME INFORMATION THAT HAS BEEN SELECTIVELY OMITTED, THEN COMPRESSED, AND THEN PARTIALLY TRUNCATED; INFORMATION THAT DEFINES A REGION FRAME USING TRANSFORMATION COEFFICIENTS AND MOTION VECTORS |
| | REPLACEMENT PIXEL DATA |
| | REGIONAL GROUP DATA |
| $f_4$ | DECODED REGION FRAME DATA: ENCODED REGION FRAME DATA WHICH HAS BEEN PROCESSED BY A DECODER |
| | REPLACEMENT PIXEL DATA |
| | REGIONAL GROUP DATA |
| $f_5$ | RECOVERED FRAME DATA: COMBINED DECODED REGION FRAME DATA |

METHOD AND APPARATUS FOR CODING SEGMENTED REGIONS IN VIDEO SEQUENCES FOR CONTENT-BASED SCALABILITY

BACKGROUND OF THE INVENTION

1. Field of the Invention

The present invention relates to the field of digital video technology, and more particularly to a method and apparatus adapted to generate region frames from video frames for contentbased scalability.

2. Background

Video sequences comprised of multiple video frames are processed by digital video coding systems prior to being transmitted as a bitstream over a channel of limited bandwidth. The bitstream includes video sequence data comprising pixel values that define the manner in which each video frame is generated onto a display. The bandwidth of the channel restricts the transmission rate of the bitstream (and video sequence data). A digital video coding system is employed to process the video sequence data in order to reduce the amount of bits or the amount of data included in the bitstream. Generally, however, the process employed by the digital video coding system, e.g., video sequence data reduction, has a negative impact on the quality of the transmitted video sequence.

Image segmentation techniques have been employed by some prior art systems to lessen the negative impact on the quality of selected regions in the transmitted video sequence. Image segmentation involves separating or distinguishing regions depicted in the video sequence in the form of segmentation data. Segmentation data includes data for indicating the region to which specific pixels in the video sequence belong. Prior art digital video coding systems utilize image segmentation techniques to reduce portions of the video sequence data according to specific regions. In other words, the quality of each region in the video sequence can be individually specified.

Referring to FIG. 1, there is shown a representation of a typical prior art digital video coding system. As shown, the digital video coding system determines the segmentation data for the regions depicted in a video sequence using an image segmenter 102. An encoder 104 encodes the video sequence along with the segmentation data provided by the image segmenter 102. The manner in which the video sequence data is to be encoded can be specified using the segmentation data such that selected regions have a higher degree of quality than other regions. Subsequently, the encoded video sequence data and segmentation data are transmitted to a decoder 106 proximate a display device, for example, where the encoded video sequence data and segmentation data are decoded and the video sequence data is recovered.

For some prior art systems, the price for improving the quality of selected regions in the video sequence is the transmission of additional bits. As shown in FIG. 1, the encoded segmentation data is included in the bitstream along with the encoded video sequence data because the encoded segmentation data is necessary to recover the video sequence. In other words, the segmentation data is normally needed to determine the manner in which the video sequence data was encoded such that the video sequence data can be re-created or recovered. In other prior art systems, the encoded segmentation data may not be necessary to recover the video sequence. However, these prior art systems do not provide content based scalability.

All prior art systems utilizing image segmentation techniques to improve the quality of selected regions in a video sequence require special encoders. Industry standard encoders are operative to encode the video sequence data using the well-known MPEG, H.261 or H.263 compression algorithms which encode the video sequence data using some combination of discrete cosine transformation and motion compensation. The region to which a particular pixel belongs is irrelevant to these compression algorithms. The exemplary encoder 104 of the prior art system thus employs a different compression algorithm for encoding the video sequence according to region. This requires the encoder 104 to perform an extra process before the video sequence data can be encoded. Specifically, the encoder 104 must first determine which region each pixel value belongs to before the video sequence data can be encoded. These type of encoders have not been widely accepted by the industry. Accordingly, there exists a need for a digital video coding system that employs an industry standard encoder to lessen the negative impact on the quality of the transmitted video sequence while still transmitting fewer bits.

SUMMARY OF THE INVENTION

The present invention discloses a method and apparatus for generating region frames from video frames for content based scalability. In one preferred embodiment of the present invention, the method for generating region frame data from video frame data comprises: extracting pixel values defining a subject region from the video frame data into the region frame data; assigning a non-subject pixel value in the region frame data for defining non-subject regions; and specifying previously segmented pixel values in the region frame data for defining previously segmented regions. The video frame data and region frame data include pixel values that define regions which can be categorized as subject regions, previously segmented regions or non-subject regions. The non-subject pixel value is indicative of a color not indicated by any of the pixel values defining the subject region. Advantageously, the previously segmented pixel values are indicative of one or more colors and can be chosen such that the compression ratio of the region frame data is maximized.

The method of the present invention further comprises the step of recovering the video frame data from the region frame data using a non-subject pixel index. The non-subject pixel index denotes which non-subject pixel value has been assigned in the region frame data. Advantageously, unlike the prior art systems, the present invention does not require segmentation data to indicate the region to which a particular pixel value belongs in order to recover the frame data. Additionally, the region frame data converted into encoded region frame data using industry standard encoders while still providing content based scalability.

In one preferred embodiment of the present invention, the apparatus for processing video frame data into region frame data comprises: a video coding means for segmenting the region frame data from the video frame data. The video coding means includes means for extracting the pixel values from the video frame data defining the subject region; means for assigning a non-subject pixel value for defining the non-subject regions, the non-subject pixel value indicative of a color not indicated by any the pixel values defining the subject region; and means for specifying previously segmented pixel values for defining the previously segmented regions.

BRIEF DESCRIPTION OF THE DRAWINGS

For a better understanding of the present invention, reference may be had to the following description of exemplary embodiments thereof, considered in conjunction with the accompanying drawings, in which:

FIG. 2 illustrates a table that describes the transformation of a video sequence as the video sequence is processed by the present invention;

DETAILED DESCRIPTION

Figure 1:
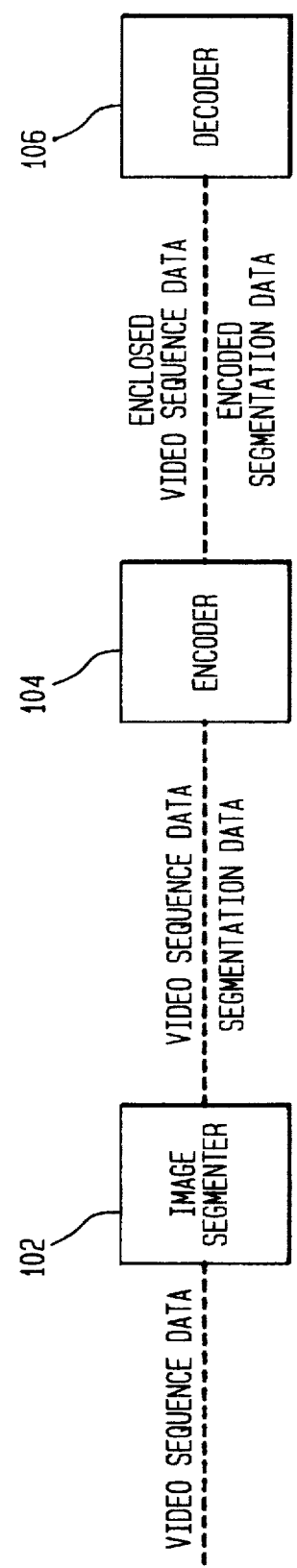
FIG. 1 illustrates a typical prior art system utilizing image segmentation techniques to encode segmented regions in a video frame.
Figure 3:
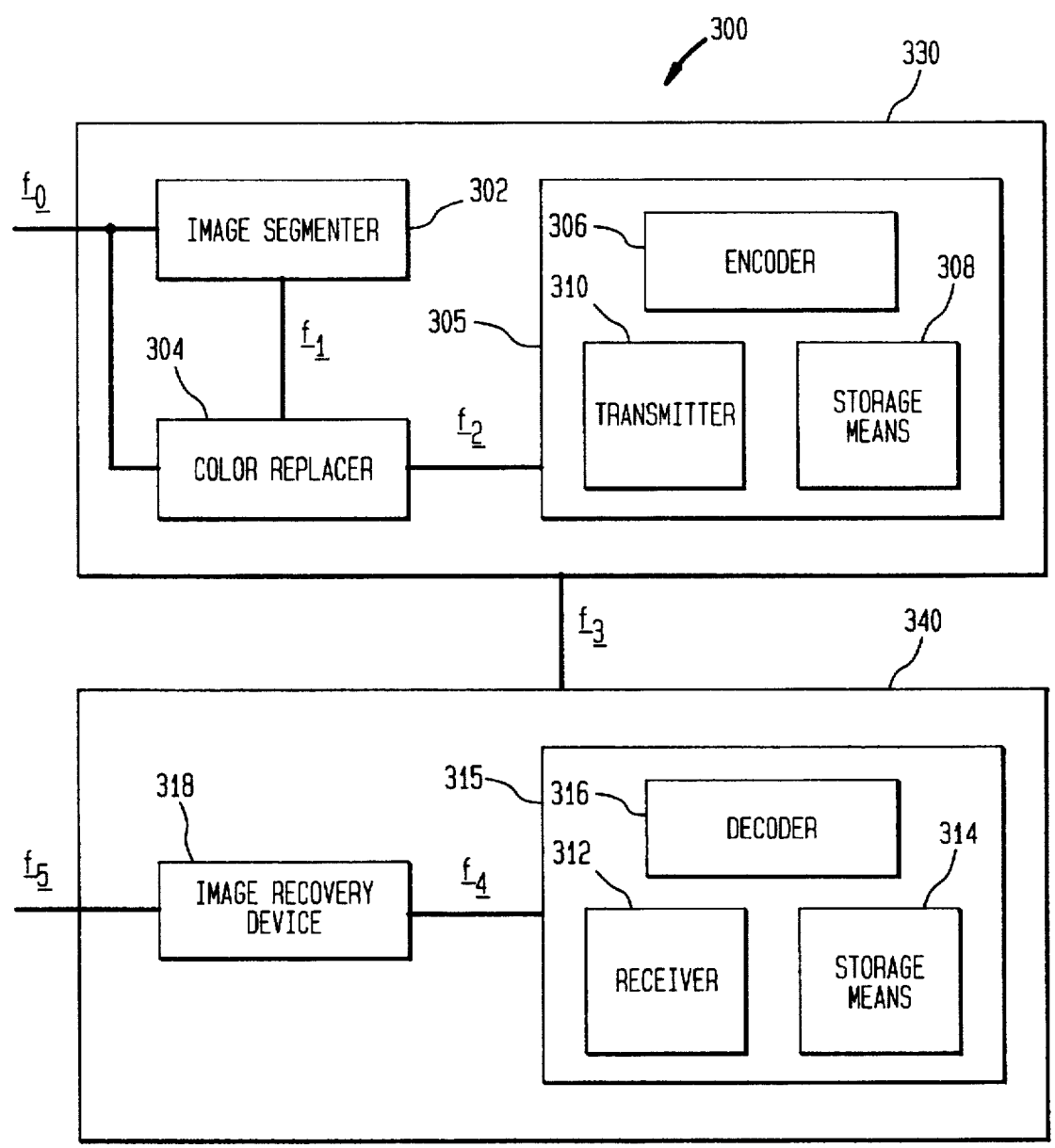
FIG. 3 illustrates a block diagram of a digital video coding system of the present invention.

The present invention discloses a method and apparatus for generating region frames from video frames for content based scalability. Referring to FIG. 3, there is shown a block diagram of one preferred embodiment of a digital video coding system 300 according to the present invention. The digital video coding system 300 comprises a video encoding system 330 and a video decoding system 340. The video encoding system 330 is a processing unit operative to generate and encode region frames. The video encoding system 330 includes an image segmenter 302, a color replacer 306 and a digital video compression means 305. The digital video compression means 305 further includes an encoder 306, a data storage means 308 and a transmitter 310. The video decoding system 340 is a processing unit operative to decode region frames encoded by the video encoding system 330 and to recover the frame data from the region frame data. The video decoding system 340 includes a digital video decompression means 315 and an image recovery device 318. The digital video decompression means 315 further includes a receiver 312, a data storage means 314 and a decoder 316.

Referring to FIG. 2, there is illustrated a table 200 that describes the components of the video sequences as the digital video coding system 300 depicted in FIG. 3 processes the video sequences. A video sequence $f_0$ comprising frame data enters the image segmenter 302. Preferably, the video sequence $f_0$ is in digital form otherwise an analog-to-digital converter, not shown, is used to convert the video sequence $f_0$ into digital form. The image segmenter 302 utilizes image segmentation to extract segmentation data corresponding to the video frames in the video sequence $f_0$. The output video sequence $f_1$ from the image segmenter 302 comprising the segmentation data enters the color replacer 304 along with the video sequence $f_0$. The color replacer 304 generates region frames from the video sequence $f_0$ utilizing the segmentation data in the video sequence $f_1$ and novel color replacement techniques of the present invention. In one embodiment of the present invention, the color replacer 304 generates one region frame for each region in each video frame. The output video sequence $f_2$ from the color replacer 304 comprising region frame data, a replacement pixel index and regional group data enters the digital video compression means 305 where the video sequence $f_2$ is encoded to reduce the amount of data needed to define the video sequence $f_2$. The output from the compression means 305 is video sequence $f_3$ comprising encoded region frame data, the replacement pixel index and the regional group data. The video sequence $f_3$ is transmitted over a channel of limited bandwidth to the video decoding system 340.

The video sequence $f_3$ transmitted from the video encoding system 330 is received by the digital video compression means 315 where the encoded region frame data in the video sequence $f_3$ is decoded. The output from the digital video compression means 315 is the video sequence $f_4$ comprising decoded region frame data, the replacement pixel index and the regional group data. The video sequence $f_4$ is then processed by the image recovery device 318 which is operative to combine the decoded region frame data using the replacement pixel index and the regional group data such that the frame data is recovered. The output video sequence $f_5$ comprising the recovered frame data can be subsequently generated onto a display, not shown. Definitions and detailed descriptions of the video encoding system 330 and the video decoding system 340 are provided herein.

VIDEO SEQUENCES

Figure 4:
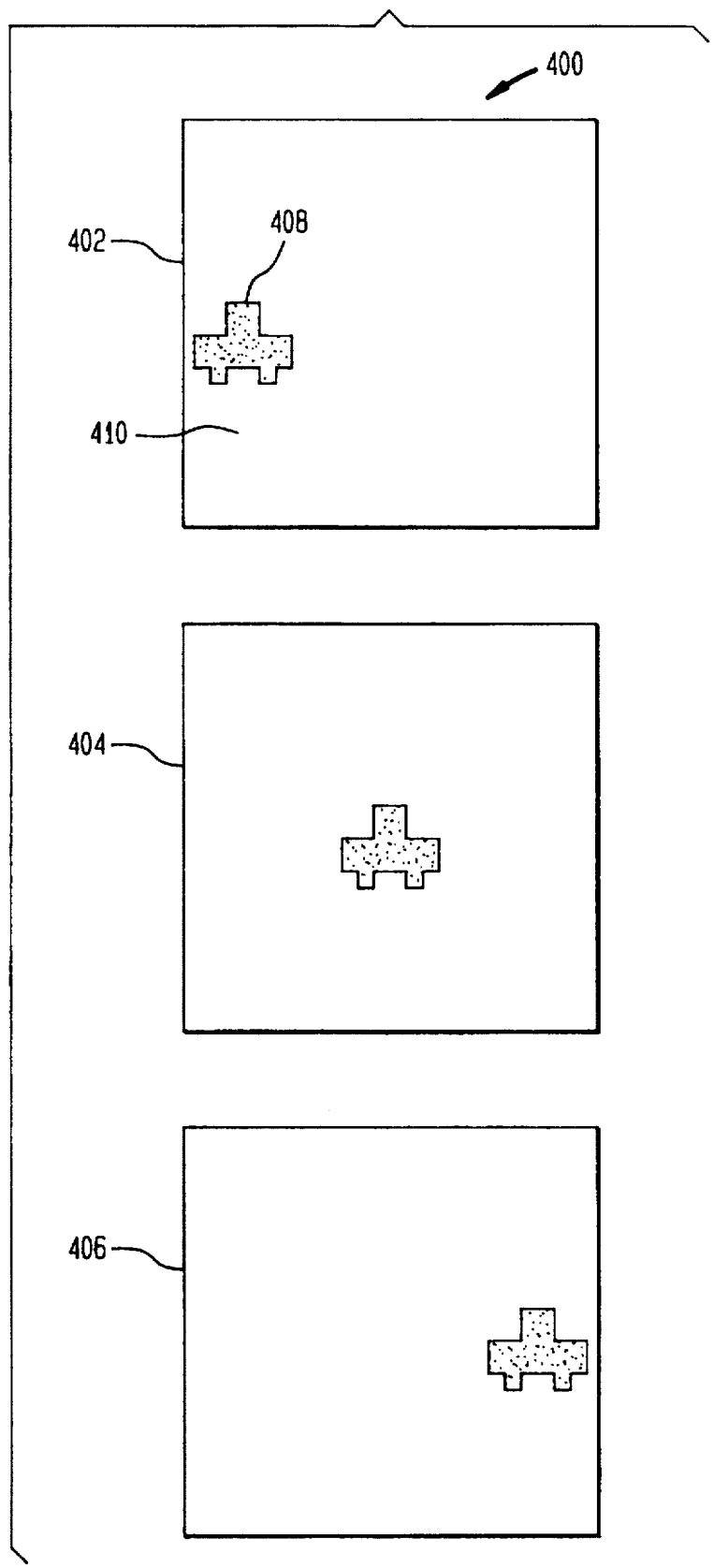
FIG. 4 illustrates a video sequence fo for input into the digital coding system depicted in FIG. 3.

Referring to FIG. 4, there is illustrated a video sequence $f_0$ 400, such as a full-motion video. The video sequence $f_0$ comprises a series of images or video frames 402, 404 and 406 having regions $R_n$, where n=1, . . . , N denotes a region in the video frame. A region is an object or group of objects depicted in the video frame. To generate the video frame on a display, such as a video monitor, the display must be provided with information that defines the video frames (referred to herein as "frame data"). Specifically, the frame data must assign a color or intensity to each pixel in the display. A pixel is the smallest element of the display which can be assigned a color or intensity. Each pixel has associated a pixel value that determines the color or intensity of the particular pixel. These pixel values constitute the frame data that defines the video frames. Note that an eight-by-eight (or sixteen-by-sixteen) block of pixels is referred to herein as a macroblock. A macroblock is defined by an eight-by-eight (or sixteen-by-sixteen) array of pixel values. Accordingly, frame data can define a video frame using macroblock arrays.

Figure 5:
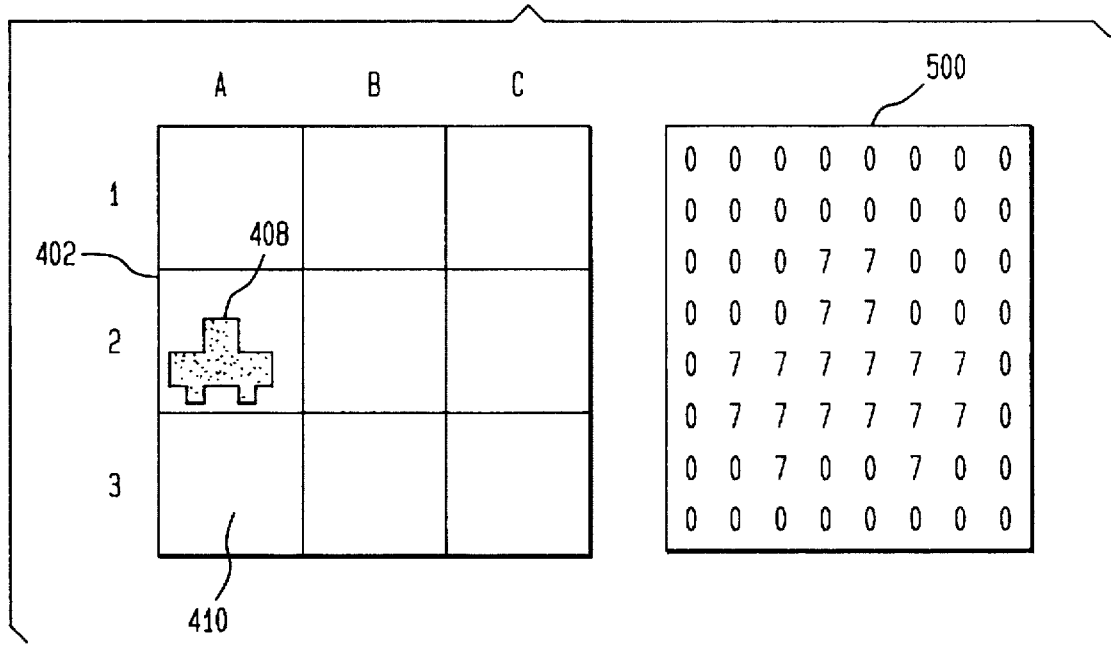
FIG. 5 illustrates the video frame 402 as being composed of macroblocks.

Referring to FIG. 5, there is illustrated an exemplary video frame 402 comprising a region 408, i.e., a black car, and a region 410, i.e., a white background, divided into a group of macroblocks. For ease of discussion, specific macroblocks are hereinafter identified by their corresponding column and row labels. A macroblock array 500 defines the macroblock A2 in the video frame 402. The pixel values "0" and "7" in the macroblock array 500 are indicative of the colors black and white, respectively.

ENCODING GENERALLY

The transmitter 310 of the present invention is operative to transmit the frame data for the video sequence $f_0$ as a bitstream over a channel of limited bandwidth to the receiver 312. The limited bandwidth of the channel, however, imposes a restriction on the rate the frame data for the video sequence $f_o$ is transmitted to the receiver 312 and subsequently generated onto a display. Referring back to FIG. 4, for example, suppose the video frames 402, 404 and 406 depict the position of the black car every one-quarter of a second, and the frame data for each of the video frames in the video sequence $f_o$ requires eighty bits in the bitstream. If the channel in which the frame data is transmitted has a bandwidth of eighty bits per second, for example, then one second is required to transmit the complete frame data for each of these video frames 402, 404 and 406. Thus, if the video decoding system 340 was generating the video sequence $f_o$ on a display as the frame data arrive at the receiver 312, the video frames 402, 404 and 406 would be generated onesecond apart instead of one-quarter of a second apart. In other words, an additional three-quarters of a second is interposed between the video frames 402, 404 and 406 causing the video sequence $f_o$ to appear four times slower when generated on the display.

To increase the transmission rate of the frame data for a video sequence to the receiver 312, a channel with a wider bandwidth can be used. This solution, however, is costly. A less expensive alternative involves employing the encoder 306 which is a processing means operative to selectively reduce the amount of frame data being transmitted. The preferred embodiment of the present invention employs an encoder 306 that processes and reduces frame data for a video sequence while maintaining a high degree of quality for the video sequence. Note that herein the term "quality" of the video sequence applies to the resolution, signal to noise ratio and/or frame rate of the video sequence. Specifically, the encoder 306 of the preferred embodiment of the present invention selectively omits the frame data for predetermined video frames in the video sequence, compresses the remaining frame data and/or truncates portions of the compressed frame data.

FRAME DATA OMISSION

The first step the encoder 306 of the preferred embodiment of the present invention employs to reduce the amount of frame data is selective omission of frame data. Referring back to the previous example in FIG. 4, suppose the encoder 306 selectively transmits the frame data for every other video frame in the video sequence $f_o$, i.e., the video frame 404 is omitted. In other words, the video sequence $f_o$ is modified by the encoder 306 to include only the video frames 402 and 406, which depict the position of the black car one-half of a second apart. Since the frame data for both of these video frames consume eighty bits each, they would still arrive at the receiver 312 one-second apart but the additional time interposed between the two video frames has been reduced from three-quarters of a second to one-half of a second. Thus, the modified video sequence $f_o$ would appear two times slower when generated on the display.

COMPRESSION

The second step the encoder 306 of the preferred embodiment of the present invention employs to reduce the amount of frame data is compression. Compression involves encoding the frame data for the video frames such that less information is required to define the same video frames. Suppose, for example, the frame data for the video frame 402 and 406 were compressed fifty percent by the encoder 306, thus making the frame data for those video frames forty bits each. The frame data for the video frame 404 can now be completely transmitted one-half of a second after the complete transmission of the frame data for the video frame 402. Thus, no additional time is interposed between the video frames 402 and 406 and the modified video sequence $f_o$ can be subsequently generated on the display without any undesirable time delay interposed between the video frames.

A compression algorithm, such as the well-known MPEG, H.261 or H.263 compression algorithm, is employed by the encoder 306 in one embodiment of the present invention to convert the frame data into a compressed form of the frame data (also referred to herein as "compressed frame data"). The typical compression algorithm converts the macroblock arrays into transformed macroblock arrays, transformed difference arrays and motion vectors that define the same video frame. Transformed macroblock arrays are arrays of transformation coefficients representing the frequency components of the pixel values in the original macroblock array. Transformed difference arrays are arrays that indicate the difference between the transformation coefficients of two transformed macroblock arrays. Motion vectors are vectors indicative of a change in relative position between a macroblock in one video frame and a second macroblock in a second video frame. Accordingly, compressed frame data can be described as frame data that defines a video frame using transformation coefficients and motion vectors instead of pixel values. A brief description of the well-known MPEG compression algorithm is provided herein for a better understanding of the present invention.

Figure 6:
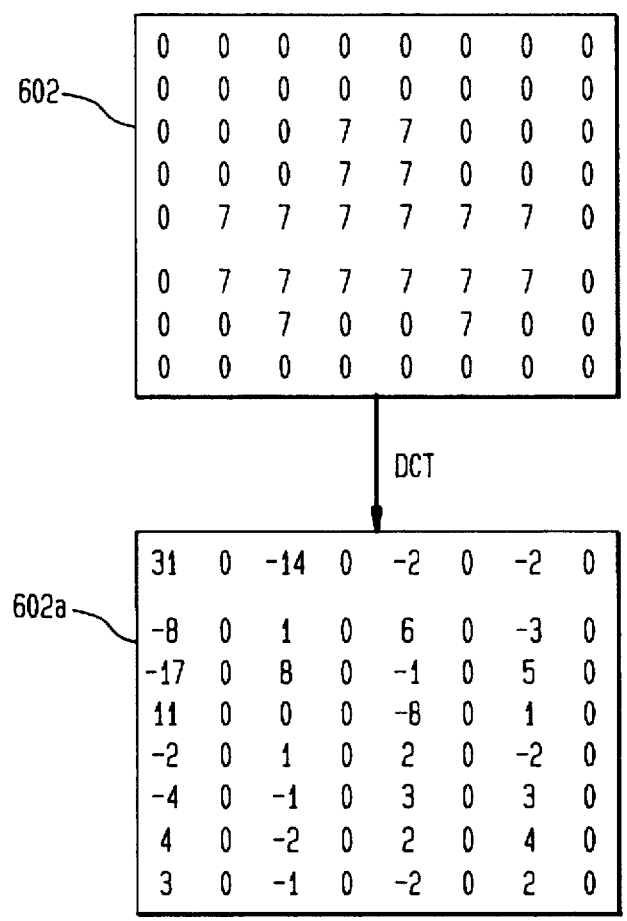
FIG. 6 illustrates pixel values for the macroblock A2 in the video frame 402 depicted in FIG. 5.
Figure 10:
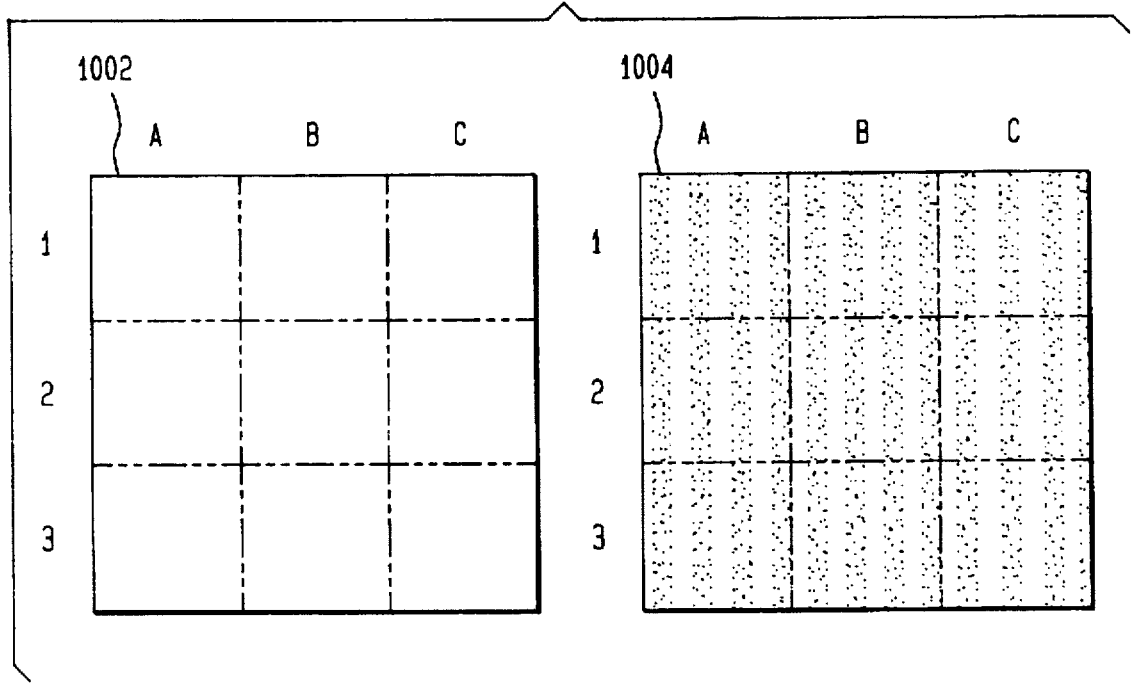
FIG. 10 illustrates video frames depicting a person with a white shirt and a person with a stripe shirt.

The MPEG compression algorithm uses discrete cosine transformation and motion compensation to convert frame data into compressed. frame data. Compression of the frame data is maximized when discrete cosine transformation and motion compensation are most effective, as will be explained herein. The discrete cosine transformation is a well-known technique which, in general terms, converts macroblock arrays into transformed macroblock arrays. Referring to FIG. 6, there is illustrated a macroblock array 602 and the corresponding transformed macroblock array 602a. The transformed macroblock array 602a has more values closer to zero, i.e., smaller positive and negative values, than the macroblock array 602. Since the values close to zero consume less bits than values far from zero, i.e., larger positive and negative values, as is well-known in the art, the transformed macroblock array 602a will consume less bits than the macroblock 602. The effectiveness of the discrete cosine transformation increases as the number smaller positive and negative values in the transformed macroblock array increase. The discrete cosine transformation is most effective for macroblocks which have little or no variation in color or intensity, i.e., flat or dull macroblocks. An example of a flat macroblock is a macroblock A1 in a video frame 1002, as shown in FIG. 10, which depicts a white wall. Conversely, the discrete cosine transformation is least effective for macroblocks with texture and/or sharp edges, such as a macroblock A1 in a video frame 1004, which depicts a striped wallpapered wall. In other words, flat macroblocks will have transformed macroblock arrays with more near zero value transformation coefficients than macroblocks with texture or sharp edges.

Figure 11:
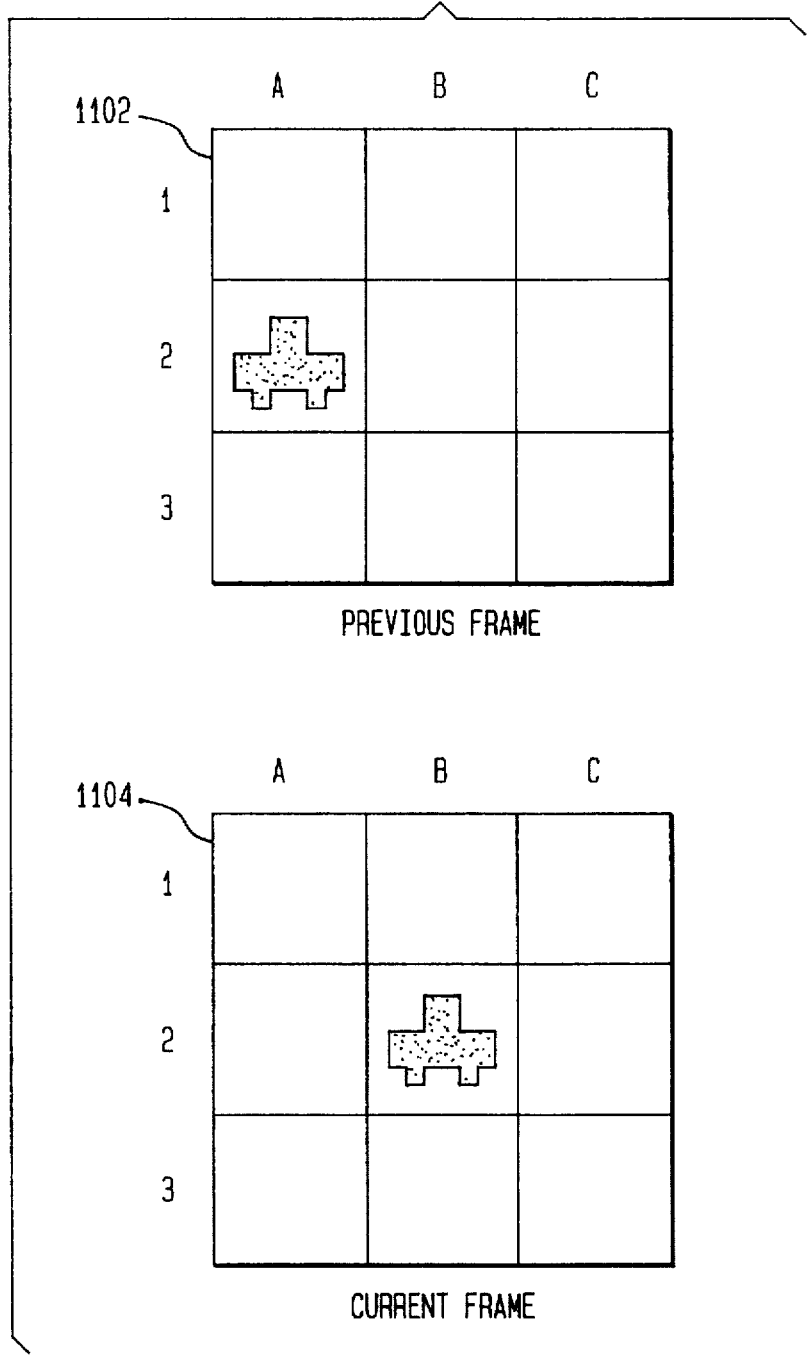
FIG. 11 illustrates a current video frame and a previous video frame.

In addition to employing the discrete cosine transformation, the MPEG compression algorithm also utilizes motion compensation to convert frame data into compressed frame data. Successive video frames in a video sequence typically have few or no differences. To transmit the frame data for a current video frame which is identical to the frame data for a previous video frame is redundant and a waste of resources. Referring to FIG. 11, there is considered illustrated a current video frame 1104 and a previous video frame 1102. In the previous video frame 1102, a car is shown in the center-left macroblock A2. In the current video frame 1104, the same car is shown to have moved to the center macroblock B2. Other than macroblocks A2 and B2, all the other macroblocks A1, A3, B1, B3, C1, C2 and C3 in the current video frame 1104 are identical to their corresponding macroblocks in the previous video frame 1102. Accordingly, the transformed macroblock arrays for the macroblocks A1, A3, B1, B3, C1, C2 and C3 in the previous video frame 1102 can be used to define the identical macroblocks in the current video frame. Thus, cost can be reduced, i.e., less bits consumed, if these identical transformed macroblock arrays are not included in the compressed frame data for the current video frame. To define the current video frame with reference to the previous video frame, motion compensation uses motion vectors and a special type of transformed macroblock array referred to herein as "transformed difference array," which will be described herein.

Motion compensation involves taking a macroblock in the current video frame (referred to herein as "current frame macroblock") and referencing the previous video frame for a macroblock which best matches the current frame macroblock. If the macroblock array for the current frame macroblock is identical to a macroblock array for a macroblock in the previous video frame, then the identical macroblock in the previous video frames is an "exact match macroblock." A current frame macroblock having an exact match macroblock is defined using a motion vector to indicate the offset in the relative position, if any, between the current frame macroblock and the exact frame macroblock in their respective video frames. For example, referring back to FIG. 11, the macroblock A2 in the previous video frame 1102 is an exact match macroblock for the macroblock B2 in the current video frame 1104. The only difference between the two macroblocks is their relative position within their respective video frames. Rather than using a macroblock array (or transformed macroblock array) to define the current frame macroblock, a motion vector indicating the difference in the relative position between the two macroblocks accomplishes the same purpose at a lesser cost. In this instance, motion compensation is most effective since a motion vector consumes less bits than a macroblock array or a transformed macroblock array.

When an exact match macroblock cannot be found for the current frame macroblock, then a best match macroblock is used. A "best match macroblock" is a macroblock in a previous video frame having a macroblock array which is closest to the macroblock array for the current frame macroblock. In such a situation, a transformation difference array may be included in the compressed frame data to define the current frame macroblock. A transformed difference array is generally calculated by first determining the difference between the pixel values in the macroblock arrays for the current frame macroblock and the best match macroblock, and then performing discrete cosine transformation on the pixel value differences. If it is determined that the transformed macroblock array for the current frame macroblock will consume fewer bits than the transformed difference array (for the current frame macroblock and the best match macroblock), then the former macroblock array is used to define the current frame macroblock. Note that if the best match macroblock is not in the same relative position as the current frame macroblock, then a motion vector is also included in the compressed frame data to define the current frame macroblock. Note that motion compensation is least effective in this type of situation, i.e., when a motion vector and a transformed difference array are needed to define the current frame macroblock.

TRUNCATION

The last step for reducing frame data prior to transmission involves truncating a portion of the compressed frame data. Referring back to FIG. 6, note that the preferred compressed algorithm of the present invention arranges the transformation coefficients in the transformed macroblock array 502a such that the larger positive and negative transformation coefficients are positioned in the upper-left corner of the transformed macroblock array 502a and the smaller positive and negative transformation coefficients are positioned in the lower-right corner of the transformed macroblock array 502a. By arranging the transformed macroblock array such that the larger transformation coefficients are positioned in the upper-left corner, the lower-right corner of each transformed macroblock arrays can be truncated without losing much of the compressed frame data. When only zero value transformation coefficients are truncated, no compressed frame data of any significance is lost. In the case where some small transformation coefficients are truncated, the compressed frame data lost is minimized since the truncated transformation coefficients represent pixels that appear less frequently in the macroblock. Note that frame data prior to compression and after compression can be utilized to generate the exact same video frames. When portions of the compressed frame data are truncated, however, the encoded frame data will generate video frames which are poorer in quality than the video frames generated from the original frame data or compressed frame data. Frame data that has undergone one or more of the aforementioned processes of the encoder 306 of preferred embodiment of the present invention is referred to herein as "encoded frame data."

To improve the quality of selected regions in the video frames undergoing the encoding process, the present invention provides a method and apparatus for generating region frames from video frames. Region frames of the present invention provide for content based scalability while using industry standard encoders and fewer bits than the prior art. The term content based scalability refers to the ability to segment video frames and to vary the quality for each region segmented from the video frame. The region frames of the present invention are generated from the video frames using the image segmenter 302 and the color replacer 304.

IMAGE SEGMENTING

Figure 7:
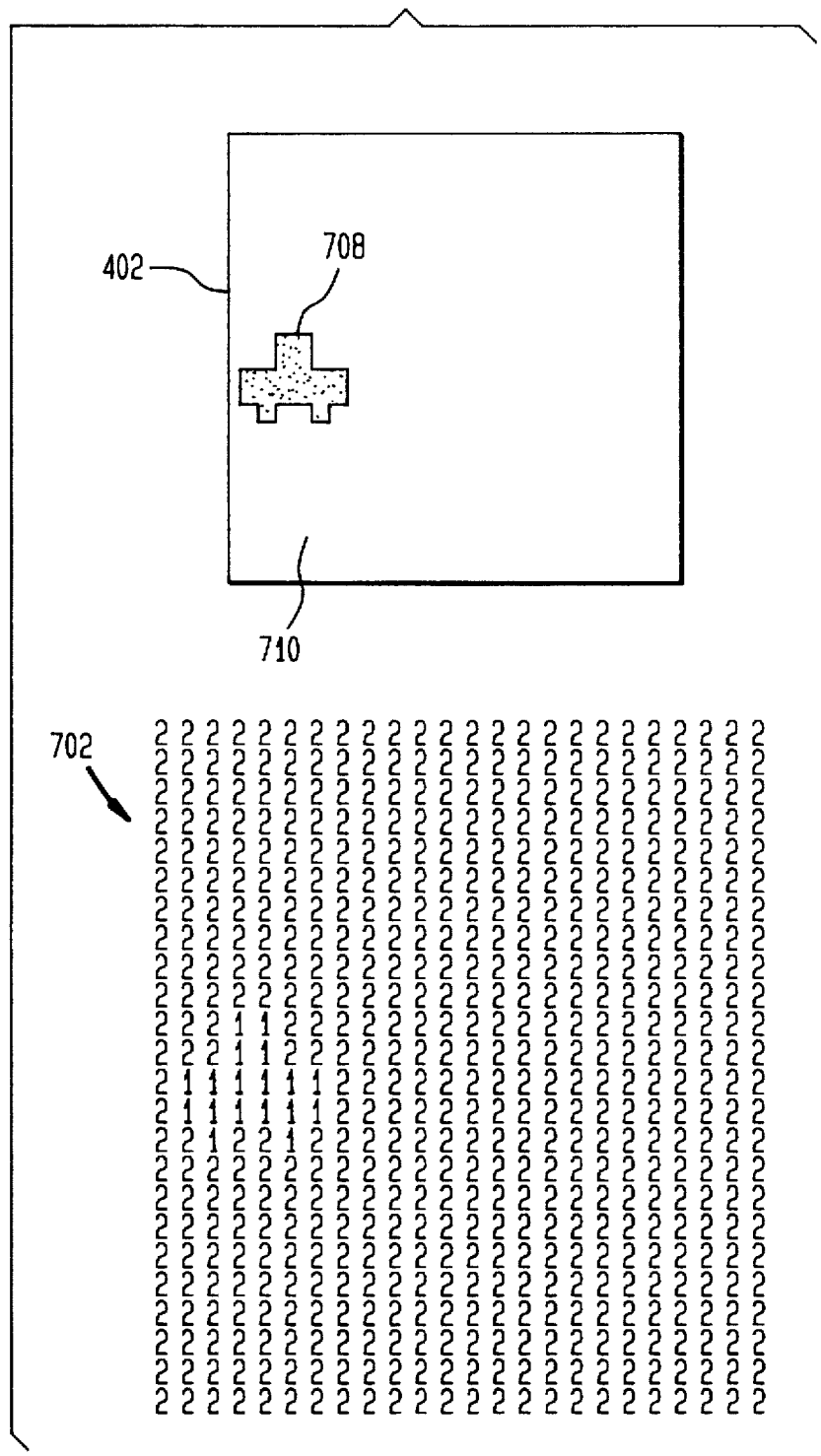
FIG. 7 illustrates a map frame corresponding to the video frame 402 depicted in FIG. 4.

Referring back to FIG. 3, the video sequence $f_0$ is received by the image segmenter 302 of the video encoding system 330 in digital form. The image segmenter 302 of the preferred embodiment of the present invention utilizes any of the wellknown image segmentation techniques to produce segmentation data. Some examples of image segmentation techniques include measurement space guided spatial clustering, single linkage region growing schemes, hybrid linkage region growing schemes, centroid linkage region growing schemes, spatial clustering schemes and split-and-merge schemes, all of which are well-known in the art. One embodiment of the present invention provides segmentation data in the form of maps. A map is an array of values indicative of the region to which a particular pixel belongs. The image segmenter 306 replaces the pixel values that constitute the frame data for video frames with values indicative of the region to which they belong. Referring to FIG. 7, there is illustrated a map 702 corresponding to the video frame 402. The map 702 comprises the values "1" and "2" to indicate the regions 708 and 719, respectively, to which the corresponding pixels belong. Using the map 702, the boundaries for the regions 708 and 710 can be extracted. For example, the region 708 is the area of the map labeled with the value "1." The boundary for the region 708 is defined by the values "1" that are adjacent, i.e., immediate left, right, top or bottom, to values other than "1." The output video sequence $f_1$ from the image segmenter 302 comprises segmentation data in the form of maps.

COLOR REPLACING

The video sequences $f_0$ and $f_1$ are provided as input into the color replacer 304. The color replacer 304 of the preferred embodiment of the present invention is operative to segment the video frames in the video sequence $f_0$ into region frames $RF_n$ using the corresponding maps in the video sequence $f_1$. Recall that $n=1,\ldots N$ denotes a region in the video frame. A region frame is a video frame where the pixels for all but one region in the image are replaced with a pixel (or pixels) of a chosen color (or colors). Frame data that defines the region frames $RF_n$ (hereinafter referred to as "region frame data") comprises original pixel values and replacement pixel values.

The regions in the region frame $RF_n$ are categorized as one of three types: subject region $R_n$, previously segmented region $R_y$, and non-subject region $R_x$, where $0<y<n$ and $n<x<N$. Each region frame $RF_n$ includes one subject region $R_n$, $n-1$ previously segmented regions $R_y$ and $N-n$ non-subject regions $R_x$. The subject region $R_n$ is defined in the region frame data $RF_n$ with the portion of the frame data that represents the subject region $R_n$ being segmented from the video frame. The previously segmented regions $R_y$ are defined in the region frame data $RF_n$ with replacement pixel values $P_{n,y}$, where $P_{n,y}$ is indicative of one or more colors for each previously segmented region $R_y$. The non-subject regions $R_x$ are defined in the region frame data $RF_n$ with a replacement pixel value $C_n$, where $C_n$ is indicative of a color not likely to be mistaken with any color in the subject region $R_n$. The manner in which the replacement pixel values $P_{n,y}$ and $C_n$ are chosen will be explained herein.

Figure 8:
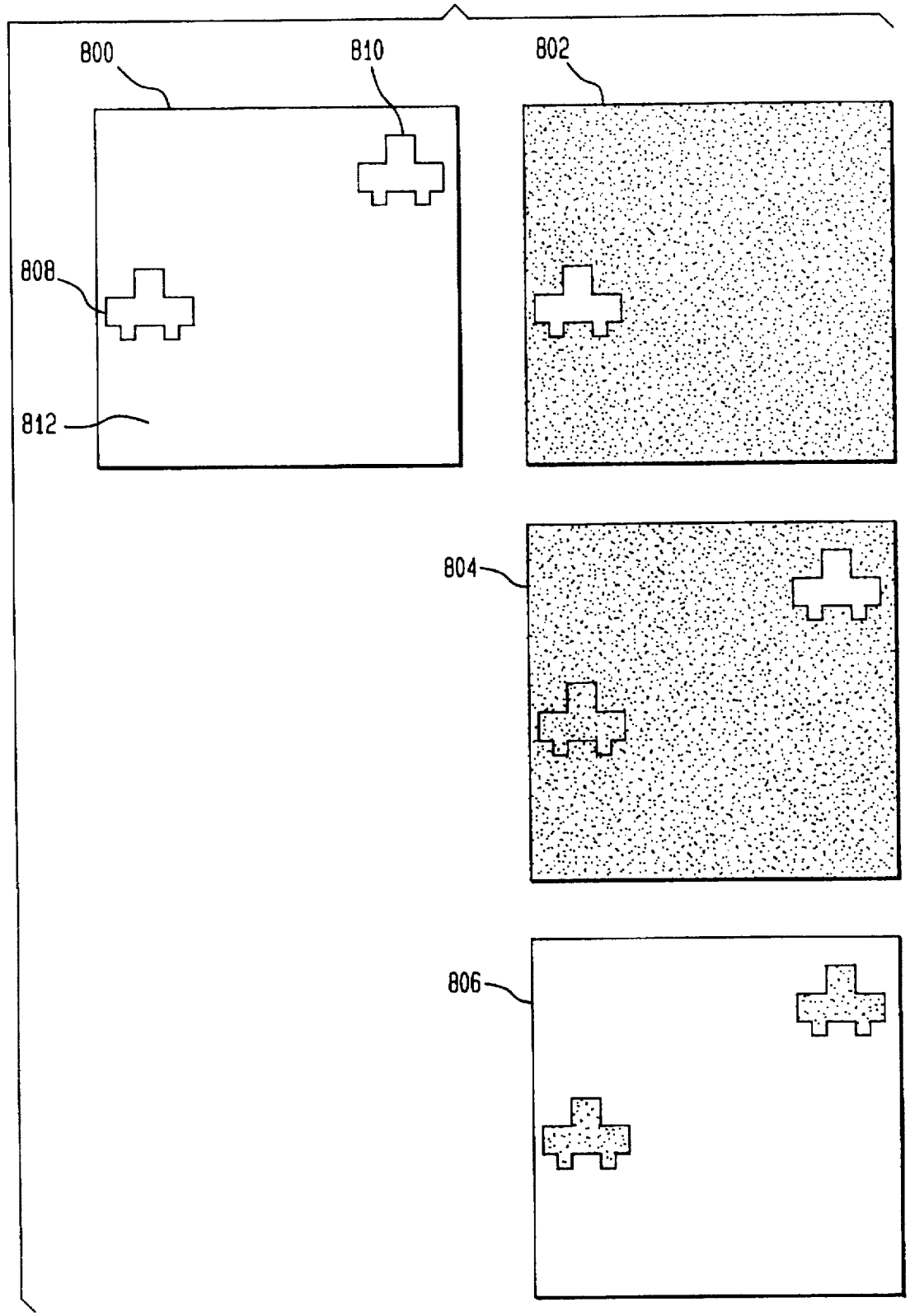
FIG. 8 illustrates the manner in which region frames are segmented from video frames.

Referring to FIG. 8, there is provided an illustration of the manner in which region frames $RF_1$ 808, $RF_2$ 10 and $RF_3$ 812 are segmented from the video frame 800. The first region frame segmented is the region frame $RF_1$ 802 which is defined by the original pixel values for the subject region $R_1$ 808 and a replacement pixel value $C_1$ for the non-subject regions $R_2$ 810 and $R_3$ 812. The color replacer 304 references the corresponding map for the video frame 800 to determine whether a particular pixel value in the frame data belongs to the subject region $R_1$ 808 or the non-subject regions $R_2$ 810 and $R_3$ 812. All of the pixel values that belong to the subject region $R_1$ 808 will be extracted from the frame data for video frame 800 and included in the region frame data $RF_1$. All of the pixel values that belong to the non-subject regions $R_2$ 810 and $R_3$ 812 will be assigned the replacement pixel value $C_1$ in the region frame data $RF_1$, where $C_1$ indicates a color that is not likely to be mistaken for any color in the subject region $R_1$ 808. Advantageously, by assigning one color to the non-subject regions, compression of the portion of the region frame data that represents the non-subject regions is maximized since the non-subject regions are flattened, as explained earlier herein.

SELECTING PIXELS FOR NON-SUBJECT REGIONS

Figure 9:
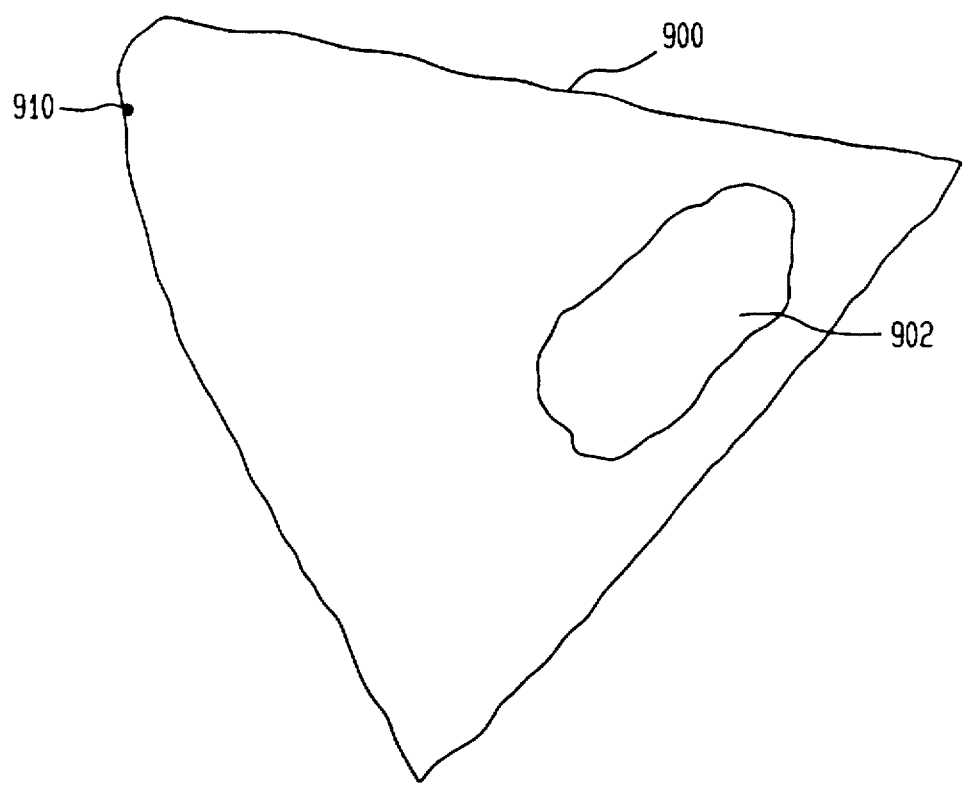
FIG. 9 illustrates a representation of a color space.

One embodiment of the present invention determines the replacement pixel value $C_1$ by performing an exhaustive search of an entire color space, e.g., RGB or YUV, for a color that is of the maximum distance from all the colors in the subject region $R_1$. A representation of a color space 900 is shown in FIG. 9. A block 902 is representative of all the colors in the subject region $R_1$ 808 and the point 910 is a maximum distance from the block 902 in the color space 900. Thus, the point 910 is chosen as the color indicated by the replacement pixel value $C_1$.

Another method for choosing a replacement pixel value $C_1$ includes selecting a color in the color space 900 that is at least a predetermined minimum distance from all the colors in the subject region $R_1$.

The second region frame segmented is the region frame $RF_2$ 804 which is defined by the original pixel values for the subject region $R_2$ 810, a replacement pixel value $C_2$ for the non-subject region $R_3$ 812 and a replacement pixel value $P_{2,1}$ for the previously segmented region $R_1$ 808. The color replacer 304 references the corresponding map for the video frame 800 to determine whether a particular pixel value in the frame data belongs to the subject region $R_2$ 810, non-subject region $R_3$ 812 or previously segmented region $R_1$ 808. All of the pixel values that belong to the subject region $R_2$ 810 will be extracted from the frame data for video frame 800 and included in the region frame data $RF_2$. All of the pixel values that belong to the nonsubject region $R_3$ 804 will be assigned the replacement pixel value $C_2$ in the region frame data $RF_2$. The replacement pixel value $C_2$ for the non-subject region $R_3$ 812 is determined in the same manner described above for the replacement pixel value $C_1$. All of the pixel values that belong to the previously segmented region $R_1$ 808 will be assigned the replacement pixel value $P_{2,1}$ in the region frame data $RF_2$. Unlike the replacement pixel value $C_2$, the replacement pixel value $P_{2,1}$ can indicate any color or intensity.

SELECTING PIXELS FOR PREVIOUSLY SEGMENTED REGIONS

The preferred embodiment of the present invention selects a replacement pixel value $P_{n,y}$ for the previously segmented region $R_y$ such that the compression ratio of the region frame $RF_n$ is maximized. Compression ratio is defined herein as the ratio of the number of bits consumed by the original region frame data to the number of bits consumed by the compressed region frame data. Specifically, the present invention utilizes the freedom to assign any color or colors to previously segmented regions $R_y$ such that the region frame $RF_n$ can be defined with the minimum amount of data. The manner in which the present invention chooses replacement pixels $P_{n,y}$ for region frames $RF_n$ depends on the positions of the subject region $R_n$ and the previously segmented regions $R_y$ in the region frame $RF_n$. Examples illustrating the manner in which the replacement pixel $P_{n,y}$ are chosen are provided below. However, this should not be construed to limit the present invention to only the methods disclosed in these examples.

When the previously segmented regions $R_y$ are not touching the subject region $R_n$, then the replacement pixels $P_{n,y}$ will be chosen such that the replacement pixels $P_{n,y}$ are not likely to be confused with any color in the subject region $R_n$. In other words, the replacement pixels $P_{n,y}$ will chosen in the same manner as $C_n$ or will be identical to $C_n$, if there is a $C_n$. For example, referring back to FIG. 8, the replacement pixel value $P_{2,1}$ for the previously segmented region $R_1$ 808 in the region frame $RF_2$ 804 should be the same as the replacement pixel value $C_2$ to flatten the region frame $RF_2$ and maximize the compression ratio.

Figure 13:
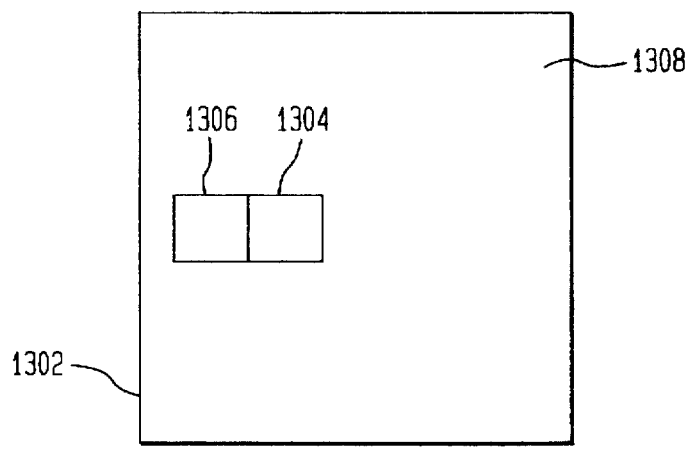
FIG. 13 illustrates a region frame $RF_2$ having a subject region $R_2$, a previously segmented region $R_1$ and a non-subject region $R_3$.

When a previously segmented region $R_y$ is touching or partially covered by the subject region $R_n$ and a non-subject region $R_x$, then the replacement pixel $P_{n,y}$ for that particular previously segmented region $R_y$ will be chosen such that there is a smooth color transition between the subject region $R_n$ and the particular non-subject region $R_x$. Referring to FIG. 13, there is illustrated a region frame $RF_2$ 1302 having a subject region $R_2$ 1306, a previously segmented region $R_1$ 1304 and a non-subject region $R_3$ 1308. Suppose the subject region $R_2$ 1306 is green and the non-subject region $R_3$ 1308 is red. For the portion of the previously segmented region $R_1$ 1304 that is touching (or partially covered by) the subject region $R_2$ 1306, the replacement pixel $P_{2,1}$ is green. For the portion of the previously segmented region $R_1$ 1304 that is touching (or partially covered by) the non-subject region $R_3$ 1306, the replacement pixel $P_{2,1}$ is red. The remaining portion of the previously segmented region $R_1$ 1304 has a replacement pixel $P_{2,1}$ that slowly changes from green to red such that there is a smooth color transition from the green subject region $R_2$ 1306 to the red non-subject region $R_3$ 1308. The smooth color transition flattens the region frame $RF_2$ 1302 as much as reasonably possible thereby maximizing the compression ratio of the region frame $RF_2$. Note that if the region frame $RF_n$ does not have a non-subject region $R_3$, then the replacement pixels $P_{n,y}$ will be the same color or colors as the boundary of the subject region $R_n$.

Figure 14:
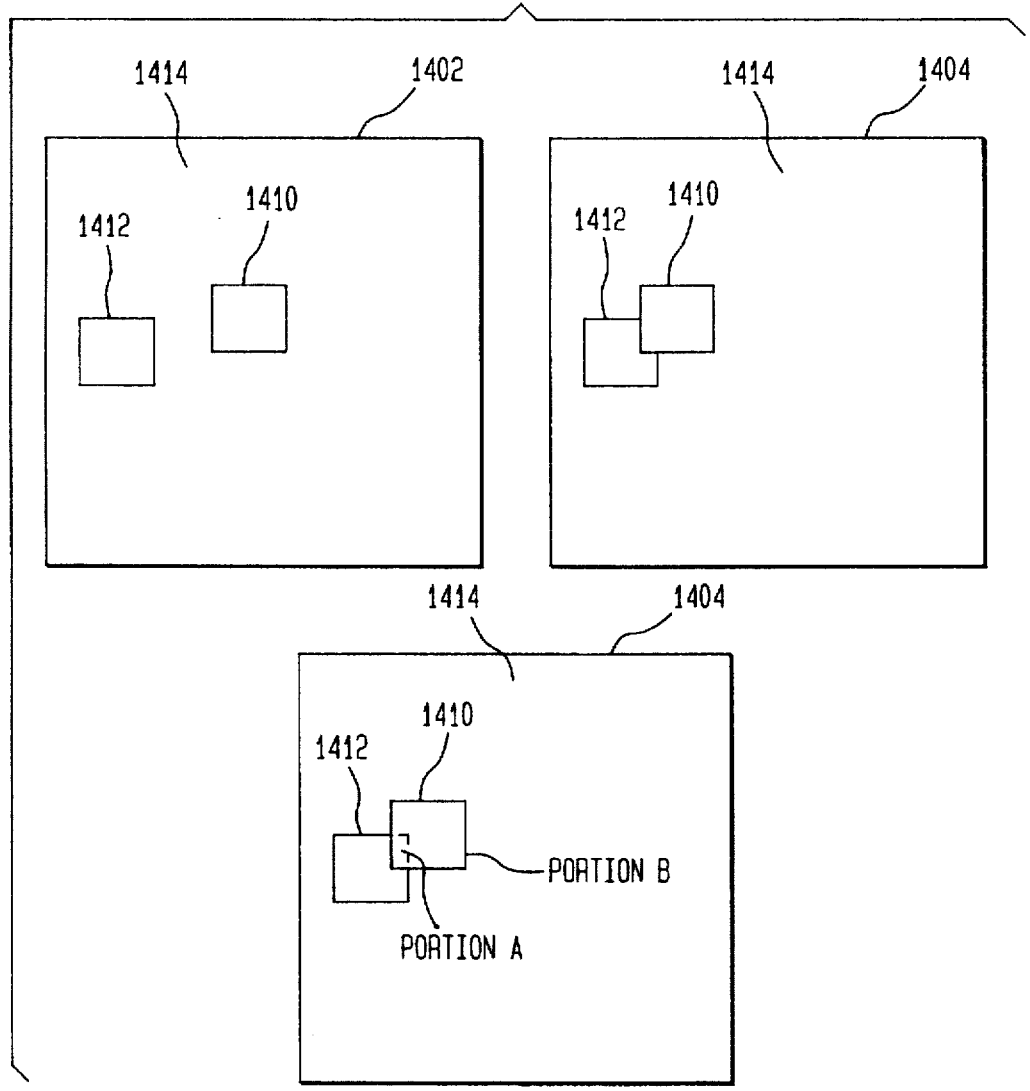
FIG. 14 illustrates depicts a previous video frame, a current video frame having three regions, and a region frame $RF_2$.

If a previously segmented region $R_y$ is partially covering the subject region $R_n$, the replacement pixel $P_{n,y}$ chosen will depend on the position of the subject region $R_n$ and that particular previously segmented region $R_y$ (which is partially covering the subject region $R_n$) in a previous video frame. Referring to FIG. 14, there is illustrated a previous video frame 1402 and a current video frame 1404 having regions 1410, 1412 and 1414. As depicted in the previous video frame 1402, regions 1410 and 1412 are separated from each other. In the current video frame 1404, the region 1412 is now partially covered by the region 1410. Region frame $RF_2$ 1406 is segmented from the current video frame 1404 and comprises a subject region $R_2$ 1412, a previously segmented region $R_1$ 1410 and a non-subject region $R_3$ 1414. In this situation, motion compensation will be employed to choose the replacement pixel $P_{2,1}$ that lies in portion A of the previously segmented region $R_1$ 1410. Specifically, the replacement pixel values $P_{2,1}$ in portion A will be identical to the corresponding pixel values in portion A of the previous video frame, i.e., the subject region $R_2$ 1412 is made to look whole, such that only a motion vector is required to define the portion A, thereby maximizing the compression ratio. The replacement pixel $P_{2,1}$ for the remaining portion B of the previously segmented region $R_1$ will be chosen in the same manner as described above when the subject region $R_2$ 1412 is touching or partially covering a previously segmented regions $R_1$ 1410.

The third and last region frame segmented from the video frame 800 in FIG. 8 is the region frame $RF_3$ 806 which is defined by the original pixel values for the subject region $R_3$ 812 and replacement pixel values $P_{3,1}$ and $P_{3,2}$ for the previously segmented regions $R_1$ 808 and $R_2$ 810, respectively. The region frame data $RF_3$ is gathered in the same above-described manner.

Note that the above-described color replacement techniques advantageously eliminate the need to include the corresponding maps in the output video sequence $f_2$ for purposes of recovering the segmented video frame, as required by the prior art. The region frame data $RF_n$ of the present invention inherently includes data defining the region boundary for the subject region $R_n$ in the region frame data $RF_n$, i.e., non-replacement pixel values $C_1$ that are adjacent to the replacement pixel values $C_1$ in the region frame data $RF_1$ constitute the region boundary for the subject region $R_1$ in the region frame $RF_1$.

ENCODING REGION FRAMES

The output video sequence $f_2$ from the color replacer 304 comprises region frame data $RF_n$, a replacement pixel index and a regional group data. The replacement pixel index indicates which pixel values are the replacement pixel values $C_n$ for each region frame $RF_n$. The regional group data indicates which region frames are segmented from the same video frame. The video sequence $f_2$ passes through the encoder 306 where the video sequence $f_2$ is processed into the output video sequence $f_3$. Specifically, as explained earlier, the encoder 306 of the preferred embodiment of the present invention omits frame data for region frames segmented from video frames in the video sequence $f_2$, compresses the remaining region frame data and/or truncates portions of the compressed region frame data. The output video sequence $f_3$ comprises truncated compressed region frame data for the non-omitted region frames (hereinafter referred to as "encoded region frame data"), the replacement pixel index and the regional group data.

The size of the portions truncated from each compressed region frame data $RF_n$ depends on the subject region $R_n$. For example, referring back to FIG. 8, suppose the details of the region 808 are deemed more important to viewers than the other regions 810 and 812. In such a situation, a lesser portion of the compressed region frame data for the region frames having the selected region as the subject region, i.e., region frame 802, is truncated. In effect, more bits are allocated for consumption by the selected region frame, e.g., the compressed region frame data for the selected region frame 802 consumes 20 bits more than the compressed region frame data for the non-selected region frames 804 and 806. This technique ensures that a high degree of quality for the selected region 808 is maintained as much as reasonably possible given the limited bandwidth of the transmitting channel and the needs of the non-selected regions.

DECODING

The transmitter 310 subsequently transmits the video sequence $f_3$ to the receiver 312 where the video sequence $f_3$ is decompressed by the decoder 316. The decoder 316 of the preferred embodiment of the present invention is operative to decompress the encoded region frame data that defines the transmitted region frames and output the video sequence $f_4$. The decompressed encoded region frame data is hereinafter referred to as "decoded region frame data." The output video sequence $f_4$ comprises the decoded region frame data that defines the transmitted region frames, the replacement pixel index and the regional group data. The decoded region frame data comprises macroblock arrays converted from the encoded region frame data. Note that the decoded region frame data in the video sequence $f_4$ is not identical to the corresponding region frame data in the video sequence $f_2$ due to the encoding process. Thus, video frames generated from the decoded region frame data typically will not be identical to video frames generated from the region frame data in the video sequence $f_0$.

IMAGE RECOVERY

The image recovery device 318 receives the video sequence $f_4$ and combines the decoded region frame data using the replacement pixel index and the regional group data. The output from the image recovery device 318 is frame data for a video sequence $f_5$, which is a modified version of the video sequence $f_0$. The frame data in the video sequence $f_5$ is hereinafter referred to as "recovered frame data." Recovered frame data comprises the combined extraction of pixel values from the decoded region frame data that belong to the subject regions $R_n$ of each region frame $RF_n$ segmented from the same video frame.

The preferred embodiment of the present invention utilizes an image recovery device 318 that extracts the pixel values of the subject regions $R_n$ from the decoded region frame data $RF_n$. Specifically, the image recovery device 318 first determines whether a specific pixel value in the decoded region frame data $RF_1$ is the replacement pixel $C_1$ using the replacement pixel index. This is achieved by comparing the specific pixel value to the replacement pixel value $C_1$ for the purpose of determining whether the specific pixel value indicates a color "near" the color indicated by the replacement pixel value $C_1$. If the specific pixel value is not "near" the replacement pixel $C_1$, then that pixel value is included in the recovered frame data. Subsequently, the first step is repeated for another pixel value in the region frame data $RF_1$. If the specific pixel value is "near" the replacement pixel value $C_1$, then the specific pixel value is detected as a replacement pixel value.

One embodiment of the present invention determines if a specific pixel value is "near" the replacement pixel value $C_1$ by measuring the distance the color indicated by the specific pixel value is from the color indicated by the replacement pixel value $C_1$. The specific pixel value is deemed near if the color indicated by the specific pixel value is within a predetermined distance, e.g. Euclidean distance, from the color indicated by the replacement pixel value $C_1$ in a predetermined color space. When a replacement pixel $C_1$ is detected, the image recovery device 318 proceeds to the second step where the decoded region frame data for a region frame $RF_n$ having previously segmented regions $R_{n-1}, \ldots, R_1$ is referenced to determine whether the corresponding pixel value is the replacement pixel $C_n$. The second step is repeated until the corresponding pixel value in the subsequent region decoded frame data is determined not to be the replacement pixel $C_n$, wherein such pixel value is included in the recovered frame data and the first step is repeated for another pixel value until the recovered frame data is entirely extracted. In other words, the region frame data $RF_n$ are referenced in ascending order according to the number of previously segmented regions in the region frame $RF_n$. Specifically, the region frame data $RF_n$ with the least number of previously segmented region frames, i.e., $RF_1$, is referenced first. The next region frame data $RF_n$ referenced is region frame data $RF_2$, then region frame data $RF_3$, etc., until a non-replacement pixel value is detected.

Figure 12:
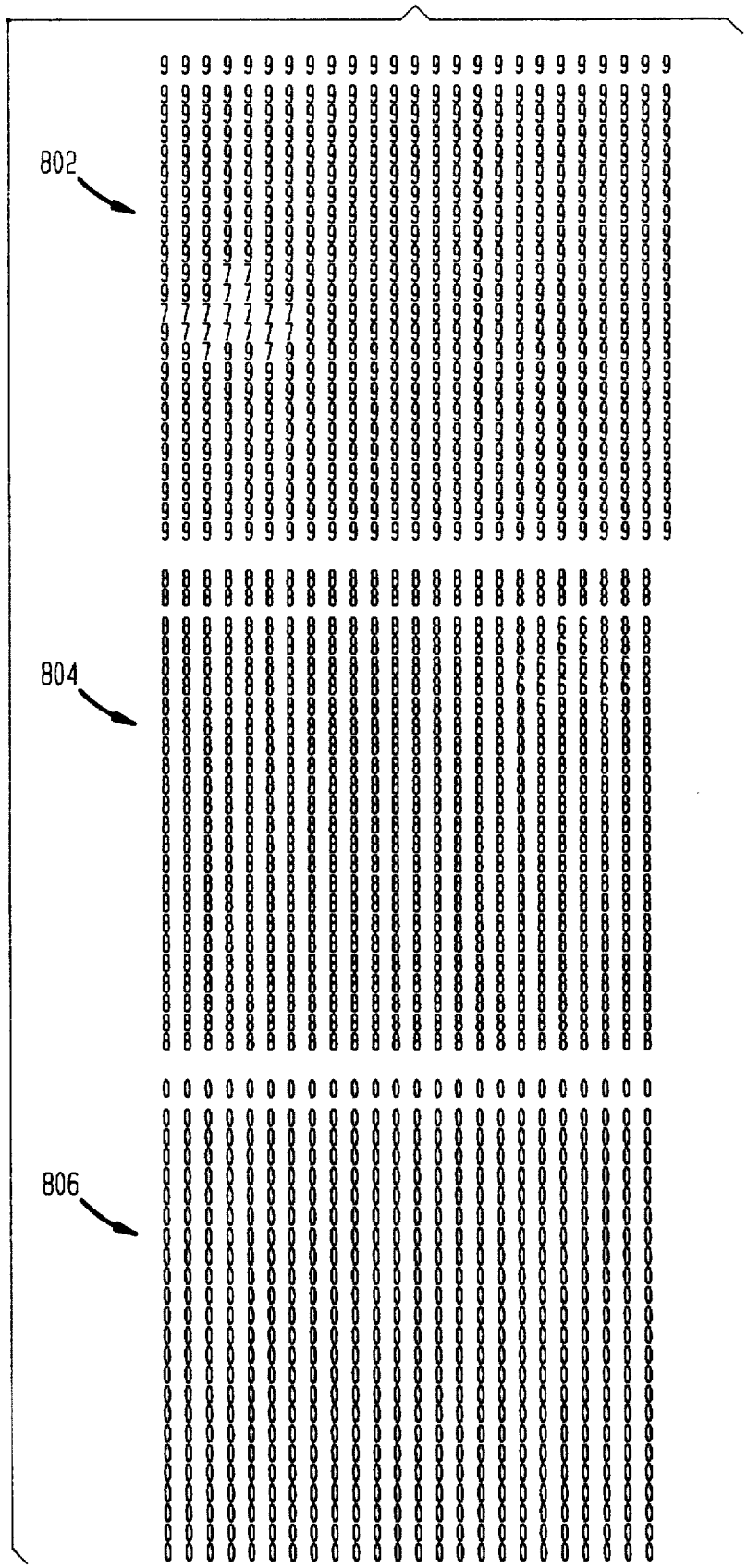
FIG. 12 illustrates decoded region frame data for the region frames depicted in FIG. 8.

Referring to FIG. 12, for example, there is illustrated the decoded region frame data for the region frames $RF_1$ 802, $RF_2$ 804 and $RF_3$ 806 depicted in FIG. 8. In one embodiment of the present invention, the image recovery device 318 references the topmost-leftmost pixel value in the decode region frame data $RF_1$ 802 and determines that it is the replacement pixel value $C_1$. The corresponding pixel value in the next decoded region frame data $RF_2$ 804 is subsequently referenced and determined to also be the replacement pixel value $C_2$. Likewise, the corresponding pixel value in the next decoded region frame data $RF_3$ 806 is referenced. In this instance, the pixel value is not the replacement pixel value $C_3$ and, thus is extracted to be included in the recovered frame data. Note that the replacement pixel values $P_{n,y}$ will never be referenced by the image recovery device 318 so long as the decoded region frame data $RF_n$ are referenced in ascending order according to the number of previously segmented regions $R_y$.

Although the present invention has been described in considerable detail with reference to certain preferred embodiments, other embodiments are also applicable. Therefore, the spirit and scope of the appended claims should not be limited to the description of the preferred embodiments contained herein.

We claim:

1. A method for generating region frame data from video frame data, wherein said video frame data and region frame data include pixel values that define regions, said regions categorized as subject regions, previously segmented regions and non-subject regions, said method comprising the steps of:

extracting said pixel values defining said subject region from said video frame data into said region frame data;

assigning a non-subject pixel value in said region frame data for defining said non-subject regions, said non-subject pixel value indicative of a color not indicated by any of said pixel values defining said subject region; and specifying previously segmented pixel values in said region frame data for defining said previously segmented regions.

2. The method recited in claim 1, wherein the step of assigning a non-subject pixel value includes the step of:

selecting said non-subject pixel value to indicate a color that is a maximum distance in a predetermined color space from any color indicated by said pixel values defining said subject region.

3. The method recited in claim 1, wherein the step of assigning a non-subject pixel value includes the step of:

selecting said non-subject pixel value to indicate a color that is a predetermined minimum distance in a predetermined color space from all colors indicated by said pixels that define said subject region.

4. The method recited in claim 1, wherein the step of specifying previously segmented pixel values includes the step of:

selecting said previously segmented pixel values to indicate one or more colors adapted to maximize the compression ratio of said region frame data to encoded region frame data.

5. The method recited in claim 1 comprising the additional step of:

assembling a non-subject pixel index which denotes said non-subject pixel values being assigned to said non-subject regions.

6. The method recited in claim 5 comprising the additional step of:

recovering said video frame data from said region frame data using said non-subject pixel index being assembled.

7. The method recited in claim 6, wherein the step of recovering said video frame data includes the steps of:

extracting said pixel values that define said subject regions from each set of said region frame data segmented from same said video frame data; and combining said pixel values being extracted from said region frame data to recover said video frame data.

8. The method recited in claim 7, wherein the step of recovering said video frame data includes the step of:

determining whether a particular pixel value in said region frame data is said non-subject pixel value.

9. The method recited in claim 8, wherein the step of ascertaining whether a particular pixel value in said region frame data is said non-subject pixel value includes the step of:

calculating a distance between said colors indicated by said particular pixel value and said non-subject pixel value in a predetermined color space; and computing whether said distance is within a predetermined threshold distance.

10. The method recited in claim 1 comprising the additional step of:

said region frame data to a video decoding unit.

11. The method recited in claim 1 comprising the additional step of:

converting said region frame data into encoded region frame data, wherein said encoded region frame data comprises of transformation coefficients representing of said pixel values in said region frame data.

12. The method recited in claim 11, wherein the step of converting said region frame data into said encoded region frame data includes the step of:

compressing said region frame data into compressed region frame data using a predetermined compression algorithm.

13. The method recited in claim 11, wherein the step of converting said region frame data into said encoded region frame data includes the step of:

compressing said region frame data into compressed region frame data using discrete cosine transformation and motion compensation.

14. The method recited in claim 13 comprising the additional step of:

decoding said encoded region frame data, said step of decoding said encoded region frame data includes converting said compressed region frame data into said region frame data.

15. The method recited in claim 11 comprising the additional step of:

transmitting said encoded region frame data to a decoding unit operative to decode said encoded region frame data.

16. The method recited in claim 15 comprising the additional step of:

decoding said encoded region frame to thereby recover said video frame data.

17. The method recited in claim 1 comprising the additional step of:

accumulating segmentation data for said video frame data to indicate said region to which a particular pixel value belongs.

18. An apparatus for processing video frame data into region frame data, wherein said video frame data and said region frame data include pixel values for defining regions, said regions include subject regions, previously segmented regions and non-subject regions, said apparatus comprising of:

video coding means for segmenting said region frame data from said video frame data, said video coding means including, means for extracting said pixel values from said video frame data defining said subject region;

means for assigning a non-subject pixel value for defining said non-subject regions, said non-subject pixel value indicative of a color not indicated by any said pixel values defining said subject region; and means for specifying previously segmented pixel values for defining said previously segmented regions.

19. The apparatus recited in claim 18 further comprising of:

image segmenter for gathering segmentation data from said video frame data, wherein said segmentation data is indicative a region to which a particular pixel value in said video frame data belongs.

20. The apparatus recited in claim 18 further comprising of:

encoder for converting said region frame data into encoded region frame data such that fewer bits are required to define said regions.

21. The apparatus recited in claim 20, wherein said encoder further includes:

means for compressing said region frame data into compressed region frame data using a predetermined compression algorithm.

22. The apparatus recited in claim 20 further comprising of:

transmitter for sending said encoded region frame data to a decoder unit.

23. The apparatus recited in claim 20 further comprising of:

decoder unit for converting said encoded region frame data into said region frame data.

24. The apparatus recited in claim 18 further comprising of:

means for assembling a non-subject pixel index which denotes said non-subject pixel values assigned to said nonsubject regions.

25. The apparatus recited in claim 24 further comprising of:

means for recovering said video frame data from said region frame data using said non-subject pixel index.

26. A method for segmenting a video frame into region frames, wherein said video frame is an image having regions $R_n$, said video frame defined by frame data including pixel values indicative of colors to be assigned to each pixel in a display, said video frame segmentable into region frames $RF_n$ said region frame $RF_n$ includes one subject region $R_n$, n−1 previously segmented regions $R_y$, where 0<y<n, and N-n non-subject regions $R_x$, where n<x≦N, said region frames $RF_n$ defined by region frame data including pixel values of colors assigned to each pixel of said subject region $R_n$, said previously segmented regions $R_y$ and said non-subject regions $R_x$, said method comprising the steps of:

extracting said pixel values that define said subject regions $R_n$ from said frame data of said video frame into said region frame data of said region frames $RF_n$;

assigning pixel values $C_n$ for said non-subject regions $R_x$ in said region frame data of said region frames $RF_n$, said pixel values $C_n$ indicative of colors not assigned to any pixel in said subject region $R_n$; and specifying pixel values $P_{n,y}$ for said previously segmented regions $R_y$ in said region frame data of said region frames $RF_n$, said pixel values $P_{n,y}$ include pixel values indicative of one or more colors.

27. The method recited in claim 26, wherein the step of assigning said pixel values $C_n$ includes the step of:

selecting said pixel value $C_n$ to indicate a color that is of a maximum distance from all said colors assigned to said pixels in said subject region $R_n$ in a predetermined color space.

28. The method recited in claim 26, wherein the step of assigning said pixel values $C_n$ includes the step of:

selecting said pixel value $C_n$ to indicate a color that is a predetermined minimum distance from all said colors assigned to said pixels in said subject region $R_n$ in a predetermined color space.

29. The method recited in claim 26 wherein the step of specifying said pixel values $P_{n,y}$ includes the step of:

selecting said pixel $P_{n,y}$ values to indicate one or more colors which would maximize the compression ratio of said region frame data to encoded region frame data.

* * * * *